(12) United States Patent
Madiwale et al.

(10) Patent No.: US 10,361,578 B2
(45) Date of Patent: Jul. 23, 2019

(54) TECHNIQUES FOR CONTROLLING CURRENT DURING POWER UP IN HOT SWAP CONTROLLERS

(71) Applicant: Analog Devices, Inc., Norwood, MA (US)

(72) Inventors: Subodh Prakash Madiwale, San Jose, CA (US); Marcus O'Sullivan, San Jose, CA (US); Gopinath Akkinepally, Campbell, CA (US)

(73) Assignee: Analog Devices, Inc., Norwood, MA (US)

( * ) Notice: Subject to any disclaimer, the term of this patent is extended or adjusted under 35 U.S.C. 154(b) by 189 days.

(21) Appl. No.: 15/591,837

(22) Filed: May 10, 2017

(65) Prior Publication Data

US 2018/0331553 A1 Nov. 15, 2018

(51) Int. Cl.
| | | |
|---|---|---|
| H01M 10/44 | (2006.01) | |
| H01M 10/46 | (2006.01) | |
| H02J 7/00 | (2006.01) | |
| H02M 3/04 | (2006.01) | |
| H02M 7/04 | (2006.01) | |
| H02M 1/36 | (2007.01) | |
| H02M 1/08 | (2006.01) | |
| H02M 1/00 | (2006.01) | |

(52) U.S. Cl.
CPC .......... *H02J 7/0072* (2013.01); *H02J 7/0052* (2013.01); *H02M 1/08* (2013.01); *H02M 1/36* (2013.01); *H02M 3/04* (2013.01); *H02M 7/04* (2013.01); *H02J 2007/0059* (2013.01); *H02M 2001/0009* (2013.01)

(58) Field of Classification Search
CPC ................... H02J 7/0026; H02J 7/0021; H02J 2007/0059; H02J 7/0013; H02J 7/0068
USPC ........................................ 320/132, 134, 136
See application file for complete search history.

(56) References Cited

U.S. PATENT DOCUMENTS

| | | |
|---|---|---|
| 6,841,979 B2 | 1/2005 | Berson et al. |
| 7,586,298 B2 | 9/2009 | Tabaian et al. |
| 7,683,693 B2 | 3/2010 | Garrett |
| 7,821,753 B2 | 10/2010 | Evans et al. |
| 8,064,180 B1 | 11/2011 | Sherwin |
| 8,159,801 B2 | 4/2012 | Fasth et al. |
| 8,680,893 B2 | 3/2014 | Spalding, Jr. et al. |
| 9,405,307 B2 | 8/2016 | Spalding, Jr. et al. |
| 2005/0072987 A1 | 4/2005 | Robb et al. |
| 2008/0310198 A1 | 12/2008 | Chiang et al. |
| 2010/0026260 A1 | 2/2010 | Xu |
| 2017/0031407 A1 | 2/2017 | Sander et al. |

*Primary Examiner* — Edward Tso
(74) *Attorney, Agent, or Firm* — Schwegman Lundberg & Woessner, P.A.

(57) ABSTRACT

Using various circuits and methods, current can be controlled when a circuit board is plugged into a powered system using two charging paths so that a first current can be supplied between a supply voltage and the load in a first charging path during a first time period and a second current can be supplied between the supply voltage and the load in a second charging path during a second time period.

20 Claims, 3 Drawing Sheets

TECHNIQUES FOR CONTROLLING CURRENT DURING POWER UP IN HOT SWAP CONTROLLERS

TECHNICAL FIELD

This disclosure relates generally to a controller device for enabling power to be supplied to an electrical load.

BACKGROUND

There are instances when it is desired to connect an electrical load to a live electrical power source or power supply (either AC or DC) that is already on. This can give rise to large in-rush currents as capacitive components of the load charge up. Such capacitive components may be real or parasitic components.

These in-rush currents can perturb the operation of the source and the load, possibly causing protective measures within the circuit to trip. Furthermore, the in-rush currents may introduce perturbations in the power supplied to other loads connected to the power supply, and these perturbations may affect the operation of those circuits. In addition, if the newly introduced load is faulty, its fault may also affect the operation of the power supply and the other loads or circuits connected to the supply. In order to address these issues, "hot swap" circuits can regulate or control the current flow to a load that is newly introduced to a power supply that allows the load to the powered up safely.

SUMMARY OF THE DISCLOSURE

This disclosure describes techniques that can be used to control current when a circuit board is plugged into a powered system, e.g., when a card is plugged into a powered server rack. More particularly, this disclosure describes an architecture that can include a two paths to charge a load.

In some examples, this disclosure is directed to a controller device for controlling a charging of a load, the controller device configured to couple to a power converter circuit and at least one electronic switch, the device configured to control an operation of the converter circuit and an operation of the at least one electronic switch to limit inrush current in controlling charging of the load. The controller device comprises: a converter control output configured to provide a first control signal to control the operation of the converter circuit to supply a first current in a first path between a supply voltage and the load during a first time period; and a switch control output configured to provide a second control signal to control the at least one electronic switch to supply a second current in a second path between the supply voltage and the load during a second time period, wherein the second time period is initiated after the first time period begins.

In some examples, this disclosure is directed to a method of controlling a charging of load by controlling an operation of at least one electronic switch and an operation of a power converter circuit to limit inrush current in controlling charging of a load. The method comprises controlling the operation of the power converter circuit to supply a first current in a first path between a supply voltage and the load during a first time period; and providing a control signal to control the at least one electronic switch to supply a second current in a second path between the supply voltage and the load during a second time period, wherein the second time period is initiated after the first time period begins.

In some examples, this disclosure is directed to a controller device for controlling a charging of a load, the controller device configured to couple to at least one electronic switch and control an operation of the at least one electronic switch to limit inrush current in controlling charging of the load. The controller device comprises a power converter circuit including a converter output configured to supply a first current in a first path between a supply voltage and the load during a first time period. The controller device further comprises a switch control output configured to provide a control signal to control the at least one electronic switch to supply a second current in a second path between the supply voltage and the load during a second time period, wherein the second time period is initiated after the first time period begins.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
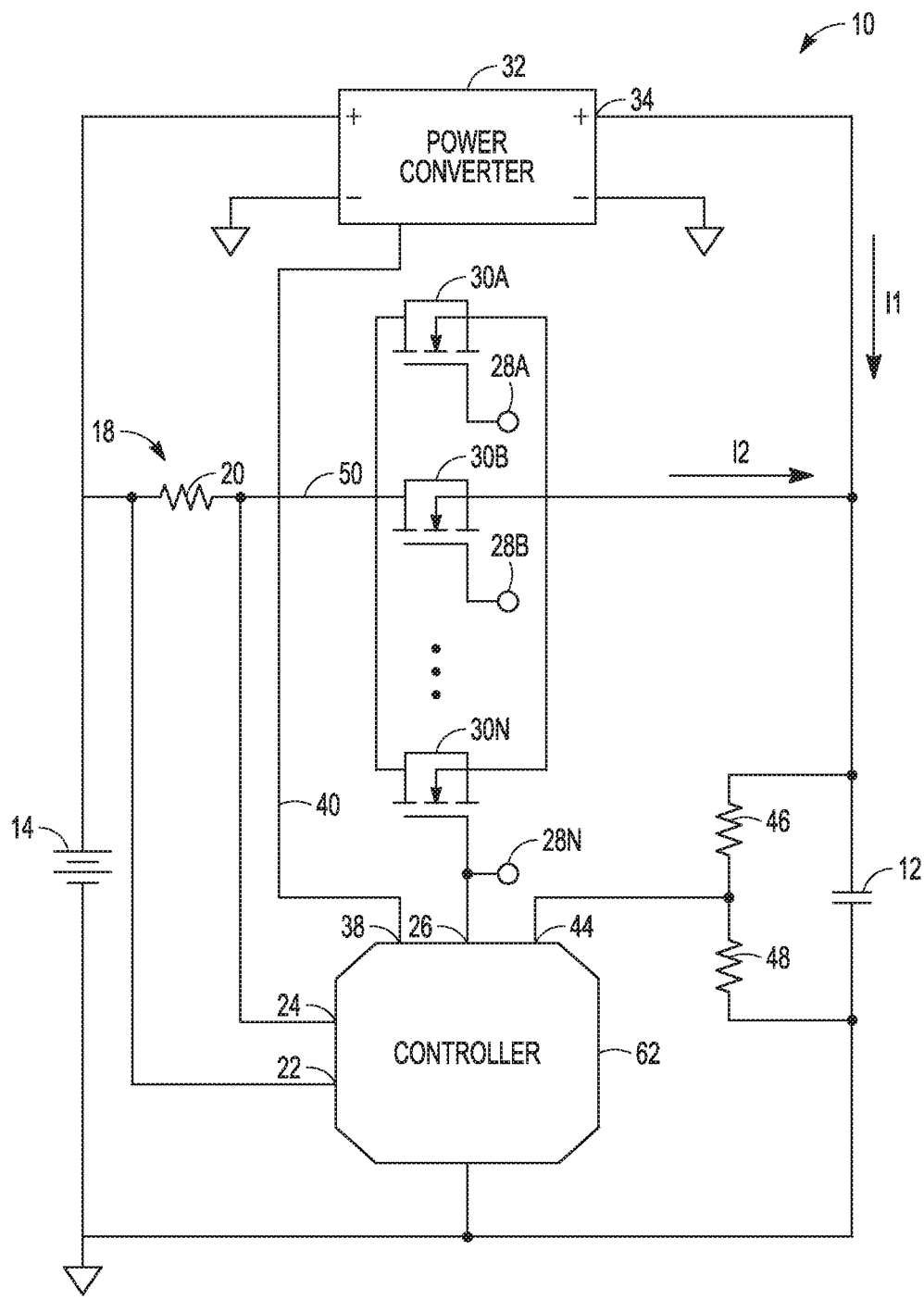
FIG. 1 is an example of a circuit for enabling a load to be connected to a power supply, using various techniques of this disclosure.

FIG. 1 illustrates a circuit 10 for enabling a load 12 to be connected to a power supply 14, using various techniques of this disclosure. The power supply and the load can also be supplying other components, which have been omitted for simplicity.

The load 12 can include one or more capacitive components that when connected to a power supply 14, can result in large in-rush currents as the one or more capacitive components charge. The circuit 10 can include a controller device 16 (or "hot-swap controller" or "controller") to control the charging of the load 12.

The circuit 10 can include a sensing circuit 18 configured to measure a representation of a current to the load. For example, the sensing circuit 18 can include a current sensing resistor 20 having a known value coupled to first and second inputs 22, 24 of the device 16 to allow the device 16 to monitor a current flow by measuring the voltage across the resistor 20.

The controller device 16 can include a switch control output 26 coupled to a respective control terminal 28A-28N of one or more electrically controllable current flow devices or electronic switches 30A-30N, e.g., transistors. For example, the switch control output 26 can be coupled to a respective gate terminals of each of transistors 30A-30N, e.g., field-effect transistors (FET), bi-polar junction transistors, or other transistors, that can be connected in parallel. In some examples, there can be one sensing element for each transistor 30.

In use, when the load 12 and the controller device 16 are connected to the power supply 14, then the voltage of the power supply can be provided to the controller device 16, thereby powering it up and also initiating a power up sequence for the load 12. The controller device 16 can apply a control signal to a respective control terminal of one or more of the transistors 30A-30N, e.g., a gate terminal of a FET, in order to enable current flow to the load 12. The controller device 16 can monitor the voltage across the current sensing resistor 20 and, in a closed loop, can control the gate voltages of the transistors 30A-30N such that the rate of change of current can be controlled to a target value or the magnitude of the current can be controlled to a target value. This can prevent excessive inrush currents being drawn by the load 12. The load 12 can be assumed to be fully powered when it is no longer possible to get the rate of current increase or the current to attain the target value or the capacitive load is fully charged up to the voltage of the input source.

Electronic power devices, such as field-effect transistors, can be damaged if they are exposed to stresses beyond their safe operating area (SOA). The SOA can define multiple regions, e.g., two SOA regions, such as an absolute maximum voltage and current that the device can withstand, and also a "linear" region where the combination of voltage, current and pulse time beyond which damage can occur. The predominant failure mechanism in the linear SOA region is overheating.

Various current limit and protection schemes can be implemented to ensure that the SOA is not violated, including current fold back, FET health, etc. There can be drawbacks to these schemes, however. For example, FETs are often oversized because any one FET in the parallel combination is desirably sized to handle the entire stress during startup and not violate the SOA. This is due to the fact that a threshold voltage, e.g., gate voltage Vgs(th), of one FET can differ from another FET and, as such, one FET may turn on before another FET. Properly sizing these FETs can incur considerable design time, and field testing can be extensive and time consuming.

In addition, because the FETs can be oversized to can handle the entire stress during startup, the best possible on-resistance of the transistor, e.g., $R_{DS}(on)$ of the FET, versus FET package size/SOA can be difficult to achieve given that those characteristics are often in conflict with one another. Finally, the SOA curves and derating of FETs can vary from one FET to another, and performance can be related to the FET vendor causing single sourcing and capacity issues.

This disclosure describes techniques that can be used to minimize or eliminate the drawbacks mentioned above. Using various techniques of this disclosure, a circuit architecture to control current when a circuit board is plugged into a powered system, e.g., when a card is plugged into a powered server rack, can include two charging paths so that a first current can be supplied between a supply voltage and the load in a first charging path during a first time period and a second current can be supplied between the supply voltage and the load in a second charging path during a second time period.

In accordance with this disclosure, the controller device 16 of FIG. 1 can be in communication with a power converter circuit 32 that can include a converter output 34 that can be coupled to the load 12 via a first path 36. This path can be in parallel with FETs 30A to 30N. The controller device 16, e.g., a "hot swap" controller, can include a converter control output 38 configured to provide a first control signal to control the operation of a power converter circuit 32 to supply a first current "I1" in the first path 36 between the supply voltage 14 and the load 12 during a first time period. For example, as the circuit 10 and the controller 16 power up, e.g., after a card is plugged into a powered unit, the controller 16 can output a first control signal via control line 40 to the power converter 32. Upon receiving the first control signal at an input 42, the power converter can turn on and start supplying the first current I1 in the first path 36 to the load during a first time period.

In some examples, the controller 16 can include a load voltage input 44 configured to receive a representation of a load voltage across the load 12. In the example implementation depicted in FIG. 1, a resistor divider including resistors 46, 48 can be coupled across the load 12 to provide the representation of the load voltage to the controller 16.

In some example implementations, the controller 16 can monitor the representation of a load voltage received via the load voltage input 44 and determine that the load voltage is increasing. When the controller 16 determines that the load voltage is sufficiently high, e.g., 5 Volts, the controller 16 can output a control signal via control line 40 to the power converter 32 to stop supplying the first current.

During a second time period that can be initiated by the controller device 16 after the first time period begins, the controller 16 can output a second control signal via a switch control output 26 to control operation of the one or more electronic switches 30A-30N. The second control signal can control the one or more electronic switches 30A-30N to supply a second current "I2" in a second path between the supply voltage 14 and the load 12 during a second time period, e.g., after the first time period has begun. In some examples, the second time period can begin when the representation of the load voltage exceeds a voltage limit, e.g., 5V.

In some example implementations, the first control signal can be configured to control the operation of the power converter 32 to stop supplying the first current I1 when the second time period is initiated. In other example implementations, it can be desirable for the first current and the second current to be supplied, at least for a limited time, simultaneously to avoid small, but finite, interruptions in charging up the load 12.

Using these techniques, a circuit architecture can be used to initially control the charging of the load 12, e.g., an output bulk capacitor, using a power converter 32 through a path (the first path 36) separate from the main path 50, which can eliminate inrush current. This separate path (the first path 36) can be independent of the main path (the second path 50). In some examples, the first path 36 can be parallel to the second path 50. The main pass transistor(s), e.g., one or more of electronic switches 30A-30N, can be turned on when the output voltage across the load 12 has reached a certain voltage level. At that time, the controller 16 can control the power converter 32 to stop supplying current via the parallel path 36. Thus, the parallel path 36 can remain off for a majority of the time.

In some example implementations, the power converter 32 can be a voltage converter. For example, the power converter 32 can include a step-down converter, such as, but not limited to, a buck converter. In some examples, the step-down converter can include an isolated converter, such as, but not limited a to, a flyback converter. In some examples, the power converter 32 can include a step-up converter circuit. The power converter 32 can be a DC-DC converter or an AC-DC converter.

The controller 16 can, in some examples, directly monitor the output voltage of the power converter 32. In other examples, it can be sufficient that the controller 16 keep the power converter 32 operating and supplying a current to the load 12. The controller 16 can, for example, monitor a representation of the load voltage received via the load voltage input 44 and determine that the load voltage is increasing, as described above.

The power converter 32 can be operated in a current mode, for example. In some example configurations, it can be desirable to operate the converter 32 in a constant current mode, thereby allowing the load 12, e.g., the output bulk capacitor, to charge at a constant rate. In addition, in a constant current mode, a fault on the output side of the power converter 32 may not cause the power converter 32 to malfunction because it is operating in constant current mode because the current will not exceed a value, e.g., a programmed value. Some example implementations can include circuitry to control the power converter 32 to shut down if a fault last longer than a certain length of time, e.g., longer than 1-5 seconds. Such configurations can include a hiccup timer that can attempt to restart the power converter 32 to see if the fault has cleared.

In a constant current mode, the power converter 32 can operate in a peak current mode, or average current mode, or a combination of peak current and average current modes. In peak current mode, the power converter 32 can control the current it supplies to the load such that the current supplied does not exceed a maximum or peak output current level. This can help prevent damage to the circuit in the event that the output becomes shorted.

In average current mode, the power converter 32 can control the current it supplies to the load such that the current supplied does not exceed an average input or output current level. In some examples, the power converter 32 can use a combination of peak current and average current modes to control current. For example, the power converter 32 can operate in an average current mode but the converter could include a peak current limit.

Figure 2:
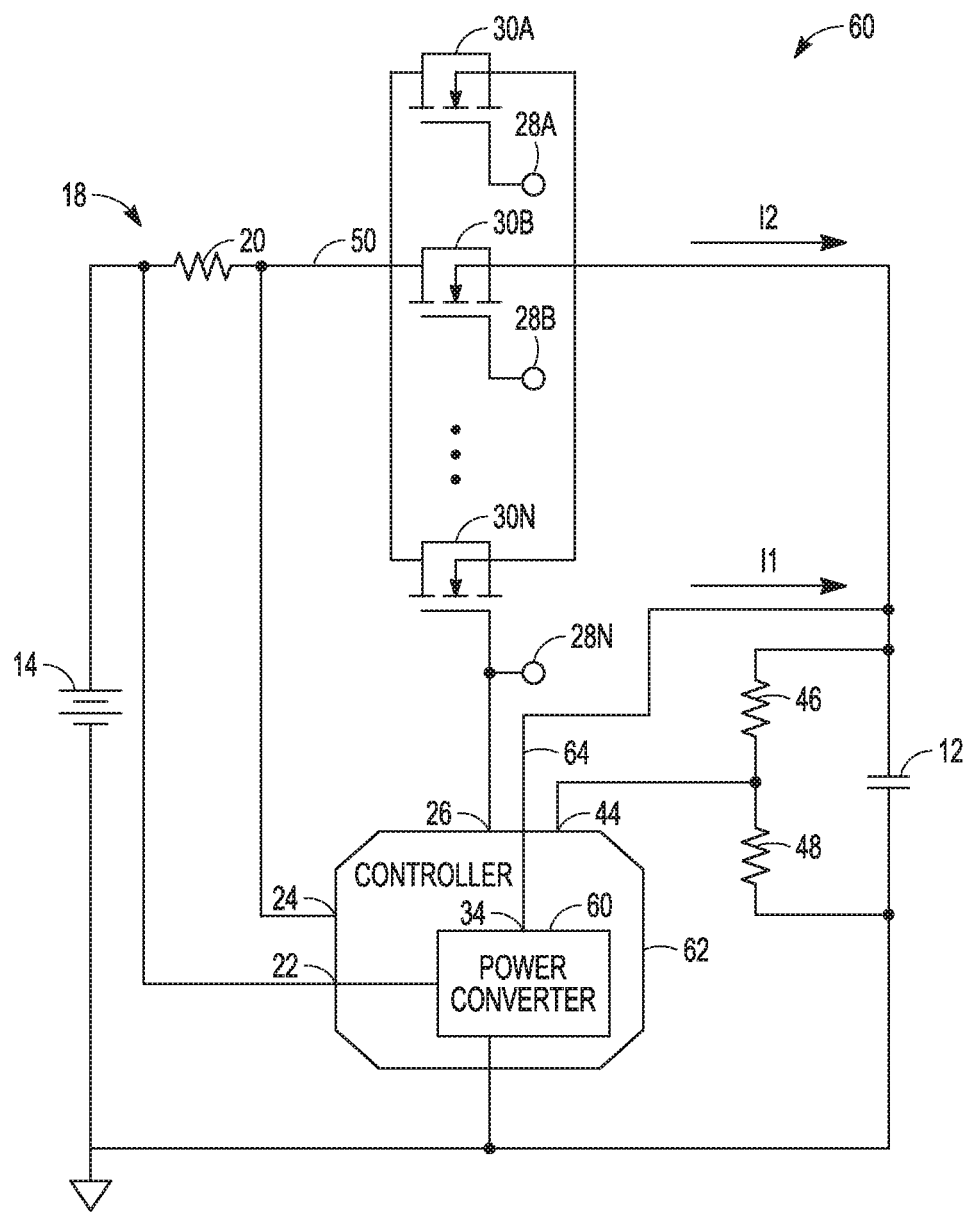
FIG. 2 illustrates a circuit for enabling a load to be connected to a power supply, using various techniques of this disclosure.

FIG. 2 illustrates another circuit 60 for enabling a load 12 to be connected to a power supply 14, using various techniques of this disclosure. In the example configuration shown in FIG. 2, the power converter circuit 60 can form a portion of the controller device 62. As seen in FIG. 2, a controller device 62 can include the power converter circuit 60.

Like the controller device 16 in FIG. 1, the controller device 62 of FIG. 2 can control the operation of the power converter circuit 60 to supply a first current I1 in a first path 64 between the supply voltage 14 and the load 12 during a first time period. The power converter circuit 60 can include a converter output 34 to supply the first current I1 in the first path 64. The power converter circuit 60 of FIG. 2 can be similar to the power converter circuit 32 of FIG. 1 and, for purposes of conciseness, will not be described in detail again. In some example implementations, one or more components of the power converter circuit 60 can be external to the circuit 60.

The controller device 62 can include a switch control output 26 configured to provide a second control signal to control one or more electronic switches 30A-30N to supply a second current I2 in a second path 50 between the supply voltage 14 and the load 12 during a second time period. In some examples, the controller device 62 can initiate the second time period after the first time period begins.

Figure 3:
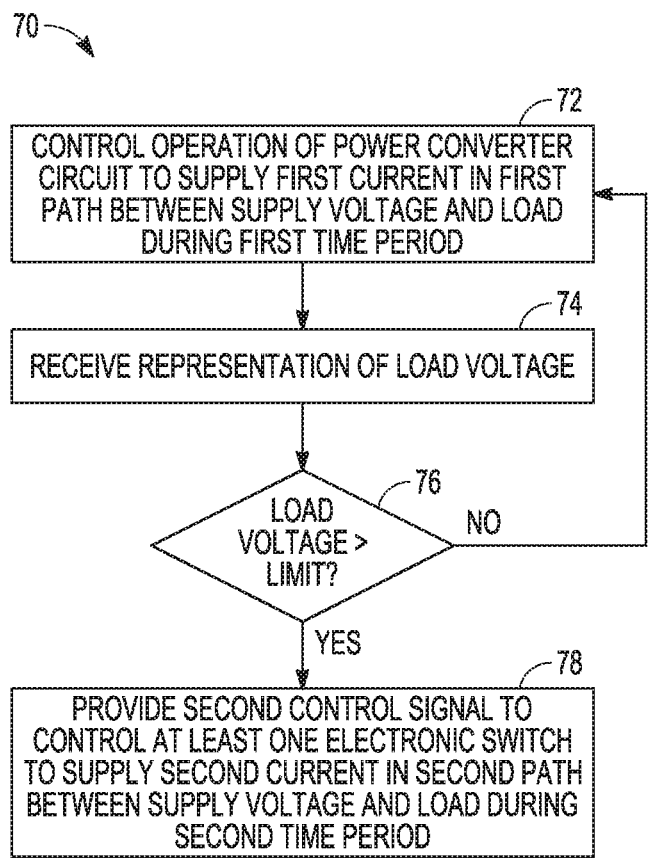
FIG. 3 is an example of a method of controlling a charging of load by controlling an operation of at least one electronic switch and an operation of a power converter circuit to limit inrush current in controlling charging of a load.

FIG. 3 is an example of a method 70 of controlling a charging of load by controlling an operation of at least one electronic switch and an operation of a power converter circuit to limit inrush current in controlling charging of a load. When a circuit board is plugged into a power system, e.g., when a card is plugged into a powered server rack, a controller device, e.g., controller device 16 of FIG. 1 or controller device 62 of FIG. 2, can power up. At block 72, the method 70 can include controlling the operation of the power converter circuit to supply a first current in a first path between a supply voltage and the load during a first time period.

For example, in FIG. 1, the controller device 16 can output a first control signal to control the operation of the power converter circuit 42 to supply a first current I1 in a first path 36 between the supply voltage 14 and the load 12 during a first time period. As another example, in FIG. 2, the controller device 62 can control the power converter circuit 60 to supply a first current I1 in a first path 64 between the supply voltage 14 and the load 12 during a first time period. At block 74, the controller device can optionally, in some examples, receive a representation of a load voltage, e.g., via a load voltage input 44 of FIG. 1.

If the received load voltage exceeds a voltage limit ("YES" branch of decision block 76), then the controller device can provide a control signal to control the electronic switch(es), e.g., switches 30A-30N of FIGS. 1 and 2, to supply a second current I2 in a second path 50 between the supply voltage 14 and the load 12 during a second time period, where the second time period is initiated after the first time period begins, at block 78. If the received load voltage does not exceed a voltage limit ("NO" branch of decision block 76), then the controller device can continue to control the operation of the power converter circuit, at block 72.

As described above, in some example implementations, the method can include operating the power converter circuit in a current mode, e.g., average current mode, peak current mode, or a hybrid of average and peak current modes.

The techniques described above can provide one or more advantages. For example, inrush current can be minimized or eliminated by using the power converter circuit to control current flowing to the load. In addition, because the power converter circuit has already established an output voltage, pass transistor(s), e.g., one or more of electronic switches 30A-30N, can be turned on quickly, thereby eliminating complicated startup circuitry in the previous state of the art architectures of the controller device. As another example, the pass transistor(s) can be selected primarily or even solely based on $R_{DS}(ON)$ values and not for SOA curves, thereby making the design more flexible to multiple transistor vendors, for example. As another example, multiple startups in a short period of time cause no stress, e.g., on the pass transistor(s) due to the constant current limit imposed by the power converter circuit (power converter circuit 32 in FIG. 1 and power converter circuit 60 60 in FIG. 2). Finally, the techniques described above can be used with any positive or negative hot swap system, e.g., for input voltages greater than 0 Volts or less than 0 Volts.

VARIOUS EXAMPLES AND NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A controller device for controlling a charging of a load, the controller device configured to couple to a power converter circuit and at least one electronic switch, the device configured to control an operation of the converter circuit and an operation of the at least one electronic switch to limit inrush current in controlling charging of the load, the controller device comprising:
   a converter control output configured to provide a first control signal to control the operation of the power converter circuit to supply a first current in a first path between a supply voltage and the load during a first time period; and
   a switch control output configured to provide a second control signal to control the at least one electronic switch to supply a second current in a second path between the supply voltage and the load during a second time period, wherein the second time period is initiated after the first time period begins.

2. The controller device of claim 1, wherein the power converter circuit includes a voltage converter circuit, and wherein the voltage converter circuit includes a step-down converter circuit.

3. The controller device of claim 2, wherein the step-down converter circuit includes a step-down DC-DC converter circuit.

4. The controller device of claim 1, wherein the power converter circuit includes a voltage converter circuit, and wherein the voltage converter circuit includes a step-up converter circuit.

5. The controller device of claim 1, wherein the power converter circuit is configured to operate in a current mode.

6. The controller device of claim 1, wherein the first path is connected in parallel with the second path.

7. The controller device of claim 1, further comprising:
   a load voltage input configured to receive a representation of a load voltage, wherein the second time period begins when the representation of the load voltage exceeds a voltage limit.

8. The controller device of claim 7, wherein the first control signal is configured to control the operation of the voltage converter circuit to stop supplying the first current when the second time period is initiated.

9. A method of controlling a charging of load by controlling an operation of at least one electronic switch and an operation of a power converter circuit to limit inrush current in controlling charging of a load, the method comprising:
   controlling the operation of the power converter circuit to supply a first current in a first path between a supply voltage and the load during a first time period; and
   controlling the at least one electronic switch to supply a second current in a second path between the supply voltage and the load during a second time period, wherein the second time period is initiated after the first time period begins.

10. The method of claim 9, further comprising:
   operating the power converter circuit in a current mode.

11. The method of claim 10, wherein operating the power converter circuit in a current mode includes:

operating the power converter circuit in an average current mode.

12. The method of claim 10, wherein operating the power converter circuit in a current mode includes:
   operating the power converter circuit in a peak current mode.

13. The method of claim 9, comprising:
   receiving a representation of a load voltage, wherein the second time period is initiated when the representation of the load voltage exceeds a voltage limit.

14. A controller device for controlling a charging of a load, the controller device configured to couple to at least one electronic switch and control an operation of the at least one electronic switch to limit inrush current in controlling charging of the load, the controller device comprising:
   a power converter circuit including a converter output configured to supply a first current in a first path between a supply voltage and the load during a first time period; and
   a switch control output configured to provide a control signal to control the at least one electronic switch to supply a second current in a second path between the supply voltage and the load during a second time period, wherein the second time period is initiated after the first time period begins.

15. The controller device of claim 14, wherein the power converter circuit includes a voltage converter circuit, and wherein the voltage converter circuit includes a step-down DC-DC converter circuit.

16. The controller device of claim 15, wherein the step-down DC-DC converter circuit includes a buck converter circuit.

17. The controller device of claim 15, wherein the step-down DC-DC converter circuit includes an isolated converter circuit.

18. The controller device of claim 14, wherein the power converter circuit is configured to operate in a current mode.

19. The controller device of claim 14, further comprising:
   a load voltage input configured to receive a representation of a load voltage, wherein the second time period begins when the representation of the load voltage exceeds a voltage limit.

20. The controller device of claim 19, wherein the first control signal is configured to control the operation of the voltage converter circuit to stop supplying the first current when the second time period is initiated.

* * * * *